(12) United States Patent
Taylor

(10) Patent No.: US 10,344,438 B2
(45) Date of Patent: Jul. 9, 2019

(54) VENTED DOCK FLOAT

(71) Applicant: Techstar Plastics Inc., Port Perry (CA)

(72) Inventor: Garth Taylor, Port Perry (CA)

(73) Assignee: Techstar Plastics Inc., Port Perry (CA)

( * ) Notice: Subject to any disclaimer, the term of this patent is extended or adjusted under 35 U.S.C. 154(b) by 0 days.

(21) Appl. No.: 15/956,979

(22) Filed: Apr. 19, 2018

(65) Prior Publication Data

US 2018/0305880 A1   Oct. 25, 2018

Related U.S. Application Data

(60) Provisional application No. 62/487,308, filed on Apr. 19, 2017.

(51) Int. Cl.
| | |
|---|---|
| *E02B 3/06* | (2006.01) |
| *F16K 31/50* | (2006.01) |
| *B63B 35/34* | (2006.01) |
| *F16B 41/00* | (2006.01) |
| *F16B 35/04* | (2006.01) |

(52) U.S. Cl.
CPC .............. *E02B 3/064* (2013.01); *B63B 35/34* (2013.01); *F16K 31/504* (2013.01); *B63B 2737/00* (2013.01); *F16B 35/044* (2013.01); *F16B 41/002* (2013.01)

(58) Field of Classification Search
CPC ................................ E02B 3/064; F16B 41/002
See application file for complete search history.

(56) References Cited

U.S. PATENT DOCUMENTS

| | | | | | |
|---|---|---|---|---|---|
| 5,368,181 | A | * | 11/1994 | Myers | B65D 47/263 141/65 |
| 5,803,007 | A | * | 9/1998 | Stevens | B63B 35/38 114/266 |
| D405,044 | S | * | 2/1999 | Dietlin | D12/316 |
| 6,390,007 | B1 | * | 5/2002 | Walker | B63B 13/00 114/183 R |
| D591,405 | S | * | 4/2009 | Pogrebinsky | D23/260 |
| 7,699,012 | B2 | * | 4/2010 | Cotten | B63B 17/0018 114/197 |
| 2009/0050043 | A1 | * | 2/2009 | Alvarez | B63B 13/00 114/197 |
| 2010/0300343 | A1 | * | 12/2010 | Wise | B63B 13/00 114/197 |
| 2011/0259255 | A1 | * | 10/2011 | Pitts | B63B 13/00 114/197 |
| 2016/0280341 | A1 | * | 9/2016 | Doig | B63C 1/02 |

* cited by examiner

*Primary Examiner* — S. Joseph Morano
*Assistant Examiner* — Jovon E Hayes
(74) *Attorney, Agent, or Firm* — McMillan LLP

(57) ABSTRACT

A vented dock float and a method for providing one are provided. The dock float comprises a housing having a venting hole, a flange having a neck aligned with the hole, and a plug having a venting passage for controlling ventilation of the housing interior. The flange is spin-welded onto the exterior wall of the dock float at the venting hole. The float is then filled with light material through the flange neck. The plug having a venting passage is inserted in the neck in a non-sealing position for allowing gas trapped inside the dock float to vent out. Once the majority of the gas is vented out, the plug is moved to a sealing position to seal the dock float interior.

19 Claims, 17 Drawing Sheets

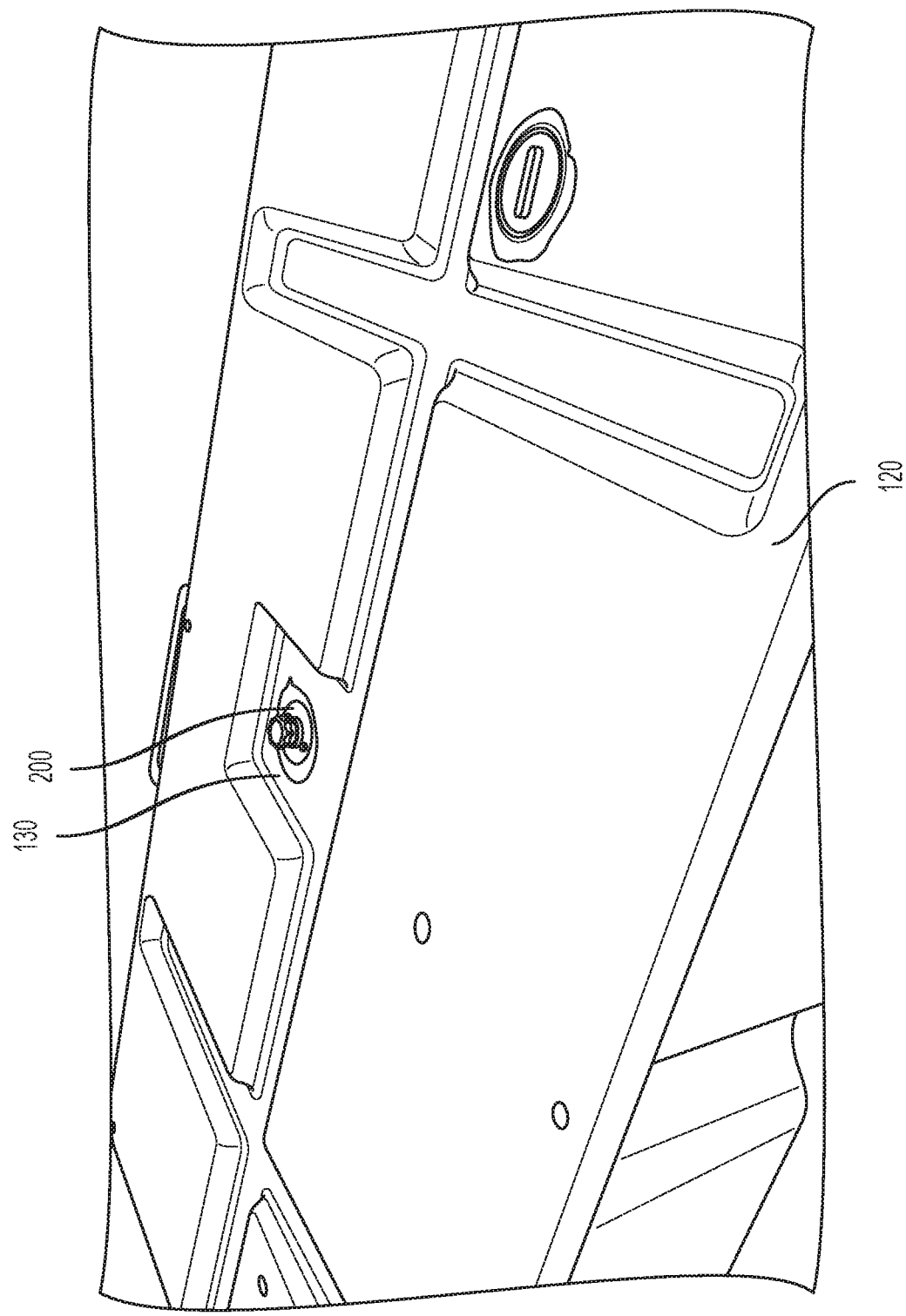

VENTED DOCK FLOAT

RELATED APPLICATIONS

This application claims priority from U.S. Provisional Patent Application 62/487,308, filed Apr. 19, 2017, and the contents of which are herein incorporated by reference in their entirety.

TECHNICAL FIELD

The present invention relates generally to dock floats, and more specifically to a vented dock float and to a method for providing a dock float with a venting mechanism.

BACKGROUND

Floating docks are known. Many such docks can be divided into one or more articulated segments held together via some type of linkage. The floating dock portions can be entirely wood structures, or, alternatively, can be assembled using floats made from various materials, including polyethylene. Sometimes the interior of dock floats is filled with a light material such as polystyrene. Filling the dock float prevents deformation or denting, and using a light material such as polystyrene maintains a low density for achieving buoyancy. However, filling dock floats with polystyrene produces a gas known as Pentane. In addition to being flammable, Pentane can also build up pressure inside the dock float and may cause the polystyrene to expand, thus causing deformation of the dock float.

SUMMARY OF THE INVENTION

In one aspect of the present invention there is provided a vented dock float, comprising: a float member, a flange, and a plug. The float member is for displacing a liquid to produce buoyancy. The float member may have a hollow housing defined by an exterior wall including a hole in a portion thereof. The flange comprises a neck having an axial bore formed by interior walls, and a planar member outwardly extending from a base portion of the neck. The flange may be sealedly attached to the housing such that the neck bore is in alignment with the hole in the exterior wall to form an access passage to the interior of the housing. The plug may comprise a shaft sized for insertion in the bore for blocking the access passage when the plug is in a sealing position, and a handle connected to a top end of the shaft for facilitating gripping the plug. The shaft may have a venting passage formed along at least a portion thereof for permitting ventilation of the interior of the hollow housing when the plug is in a venting position.

In one embodiment, both the interior walls of the bore and the shaft are threaded and threadably engaged, the plug is partially tightened in the venting position, and the plug is fully tightened in the sealing position.

In another embodiment, both the interior walls of the axial bore and the shaft are ribbed and tightly fit to one another, the plug is partially inserted in the bore in the venting position, and the plug is fully inserted in the bore in the sealing position.

In one embodiment, the vented dock float further comprises a sealing member operably positioned around the shaft beneath the handle for sealing the access passage when the plug is in the sealing position.

In one embodiment, the vented dock float further comprises at least one protrusion on a top side of the planar member to facilitate handling of the flange by a spin-welding tool.

In one embodiment, both the shaft and the neck are cylindrical, and the planar member is a disk.

In one embodiment, the venting passage comprises a longitudinal groove.

In one embodiment, the venting passage is proximal to the handle but spaced therefrom for allowing ventilation of the interior of the housing therethrough when the plug is in the venting position.

In one embodiment, the plug further comprises a retaining member for retaining the plug within the axial bore of the flange's neck once inserted therein.

In one embodiment, the retaining member comprises two fingers flexibly biased in a bifurcated retaining position.

In one embodiment, the two fingers each terminates in hook-shaped ends.

In one embodiment, the planar member is sealedly attached to the exterior wall of the housing by spin-welding.

In one embodiment, the interior is filled with a material having a density less than the density of the liquid.

In one embodiment, the flange is circular, the planar member is a disk, and the flange further comprises a guide ring formed along a bottom surface of the disk and concentric with the neck.

In another aspect of the present disclosure, a method for providing a vented dock float with a venting mechanism is provided. The method comprises: drilling a hole through a wall of a housing of the dock float to access an interior of the housing; and welding a flange comprising a neck having an axial bore formed by interior walls, a planar member outwardly extending from a base of the neck, and a guide ring on a bottom side of the planar member to the exterior wall of the housing such that the axial bore is aligned and coaxial with the hole for providing an access passage to the interior of the housing.

In one embodiment, the method further comprises filling, through the axial bore, the interior of the housing with a material having a density less than a density of a liquid.

In one embodiment, the welding comprises spin-welding the circular flange in frictional engagement with the exterior wall around the hole such that heat is produced by friction causing melting of at least one of: a portion of the guide ring and a portion of the disk to form a sealed connection with the wall.

In one embodiment, the material is polystyrene and the step of filling the interior with polystyrene produces pentane gas as a by-product.

In one embodiment, the method further comprises inserting a plug into the axial bore of the neck in a venting non-sealing position for allowing ventilation of the interior.

In one embodiment, the method further comprises moving the plug into a sealing position for sealing the interior.

BRIEF DESCRIPTION OF THE DRAWINGS

Embodiments will now be described, by way of example only, with reference to the attached figures, wherein:

FIG. 14 is a partial perspective view of a dock float having a flange spin-welded thereon, and a plug inserted in the flange.

DETAILED DESCRIPTION OF THE EMBODIMENTS

Figure 1:
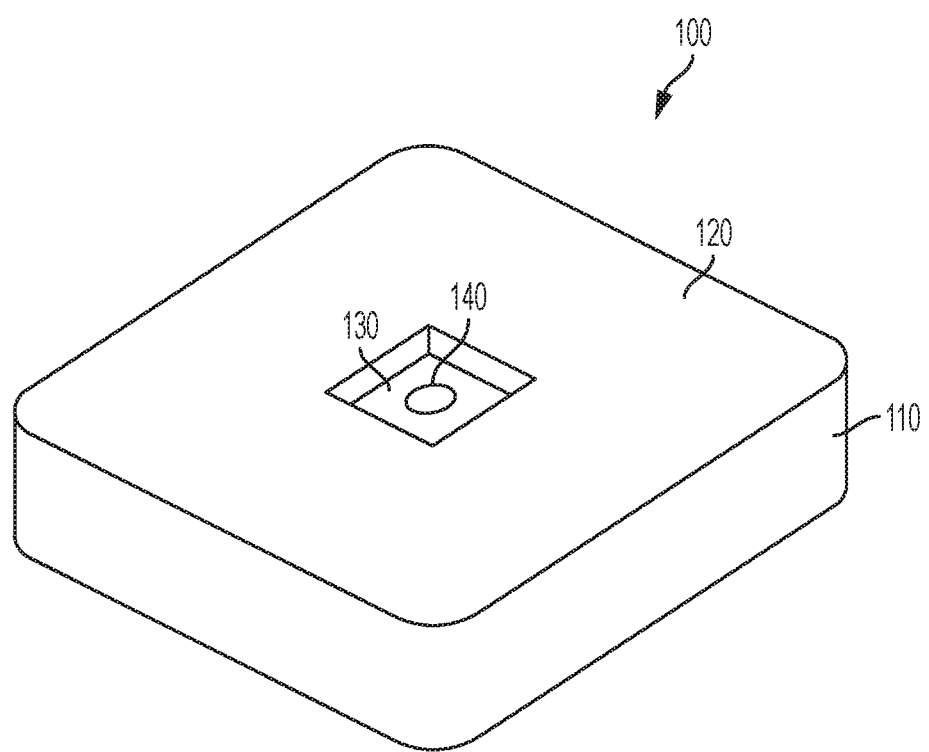
FIG. 1 is a perspective view of a float member of a dock float, in accordance with an embodiment of the present disclosure.
Figure 2A:
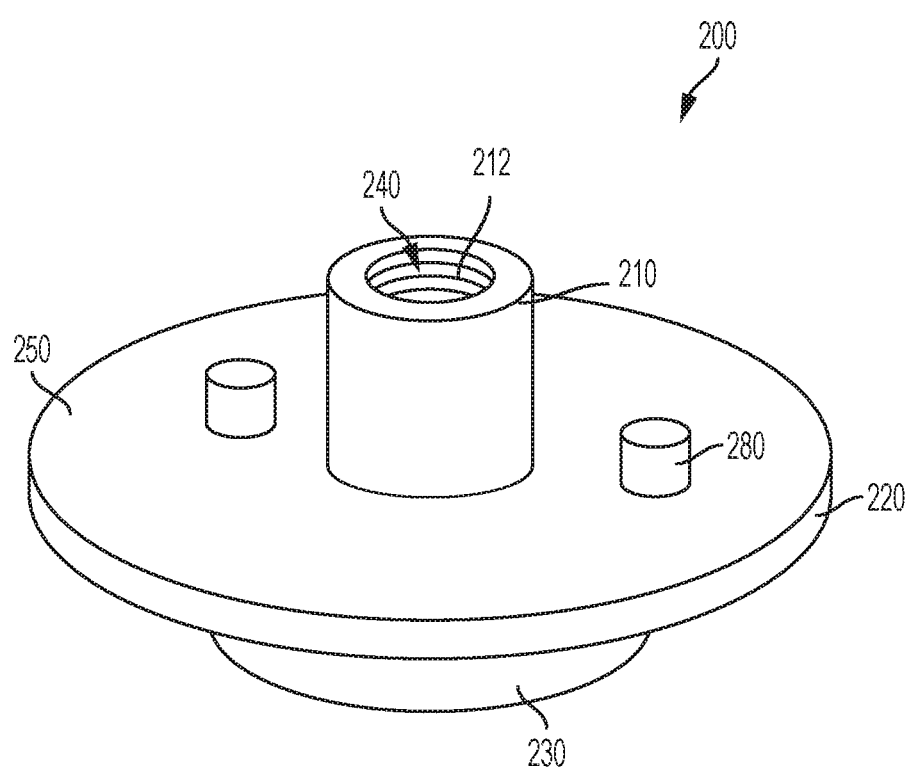
FIG. 2A is a perspective view of a flange, in accordance with an embodiment of the present disclosure.
Figure 2B:
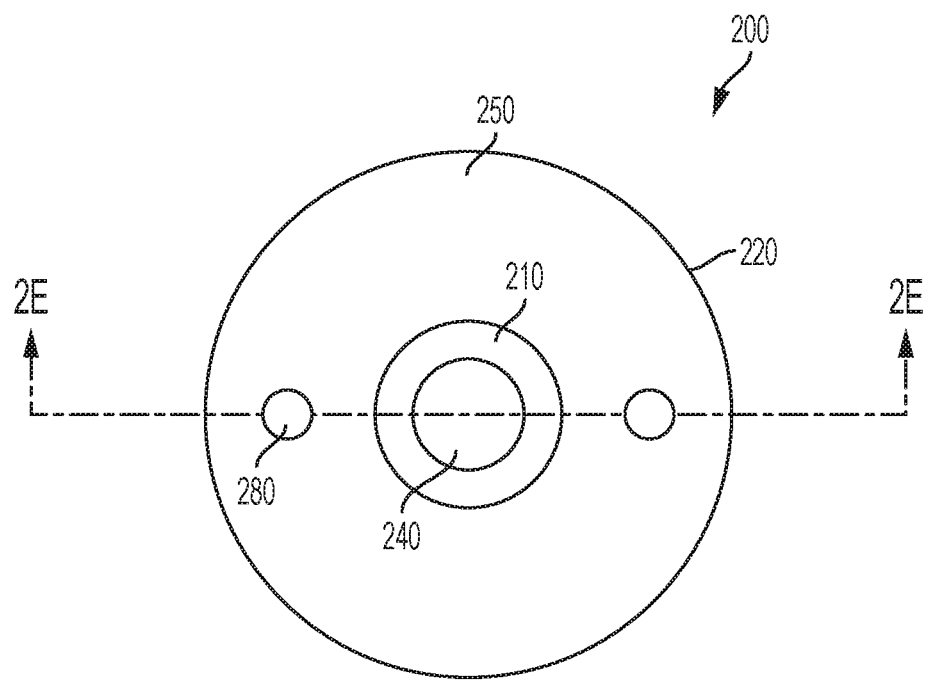
FIG. 2B is a top plan view of the flange of FIG. 2A.
Figure 2C:
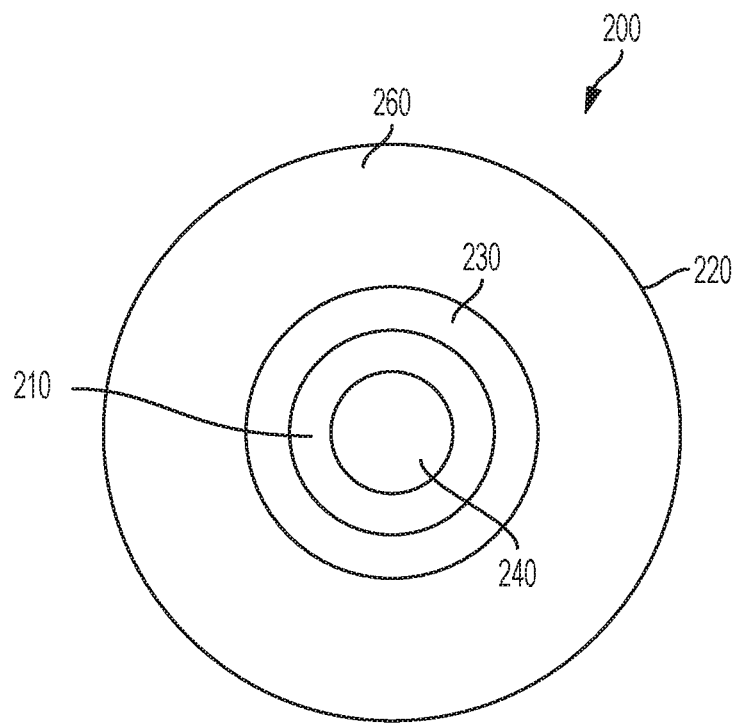
FIG. 2C is a bottom plan view of the flange of FIG. 2A.
Figure 2D:
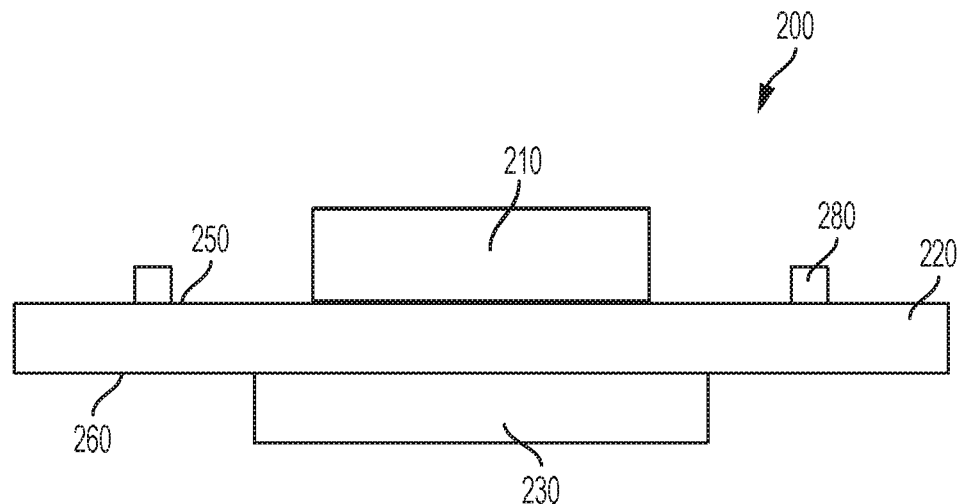
FIG. 2D is an elevation view of the flange of FIG. 2A.
Figure 2E:
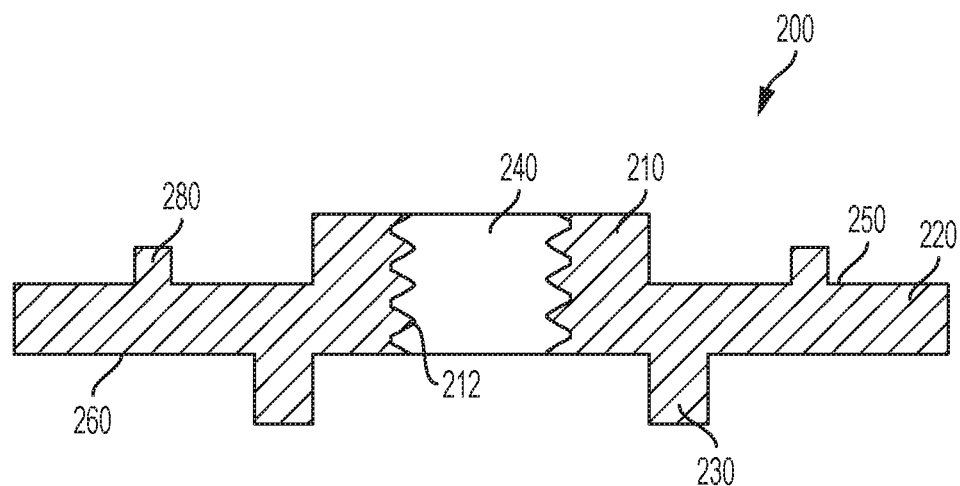
FIG. 2E is a sectional elevation view of the flange of FIG. 2A, taken at line 2E-2E of FIG. 2B.
Figure 3A:
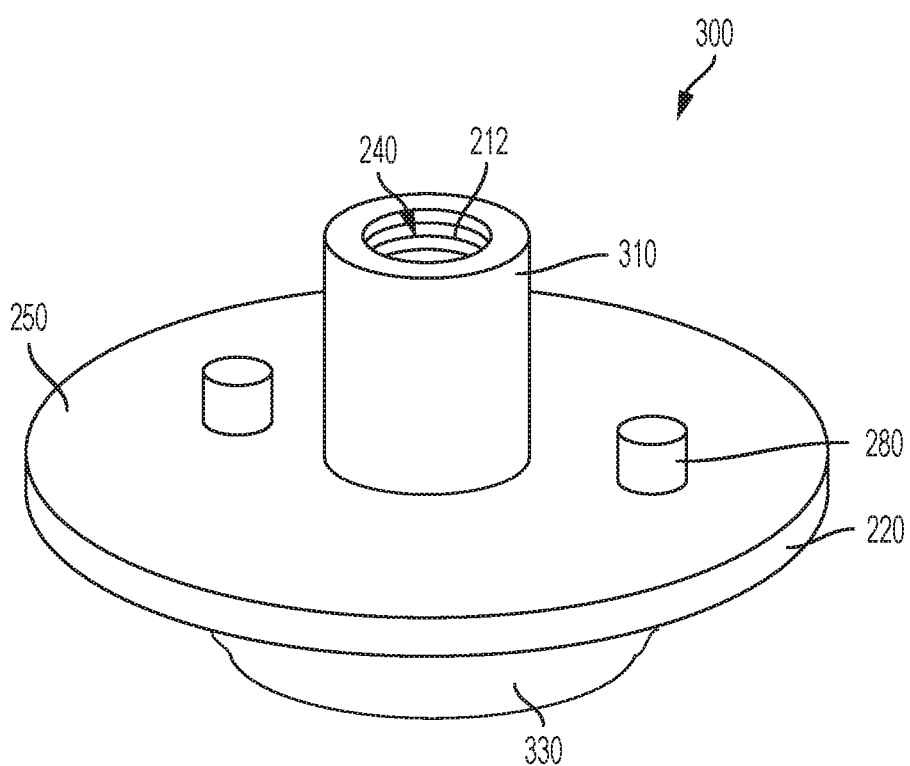
FIG. 3A is a perspective view of a flange, in accordance with another embodiment of the present disclosure.
Figure 3B:
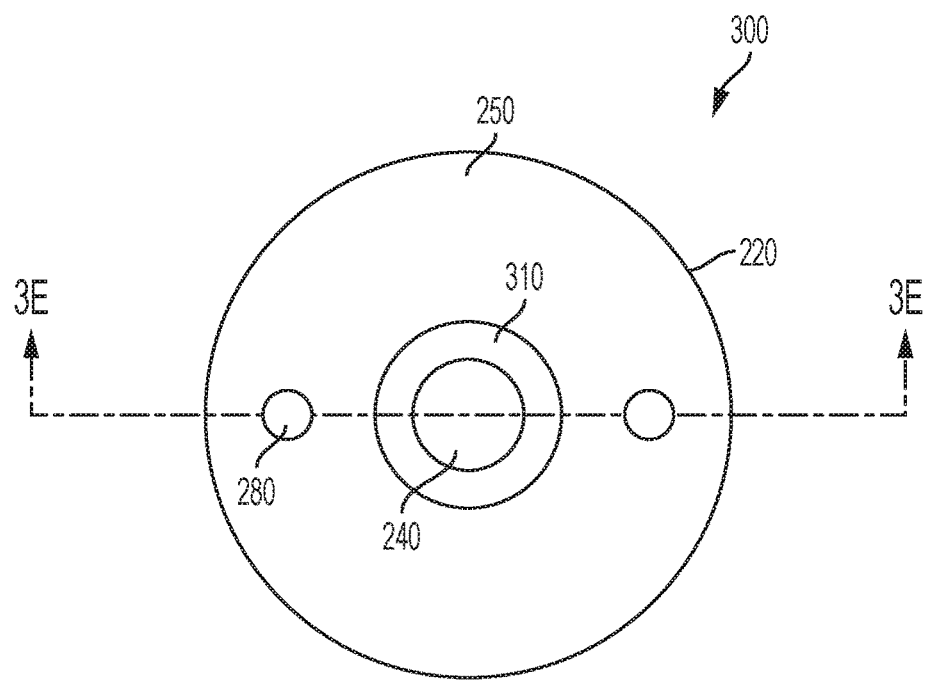
FIG. 3B is a top plan view of the flange of FIG. 3A.
Figure 3C:
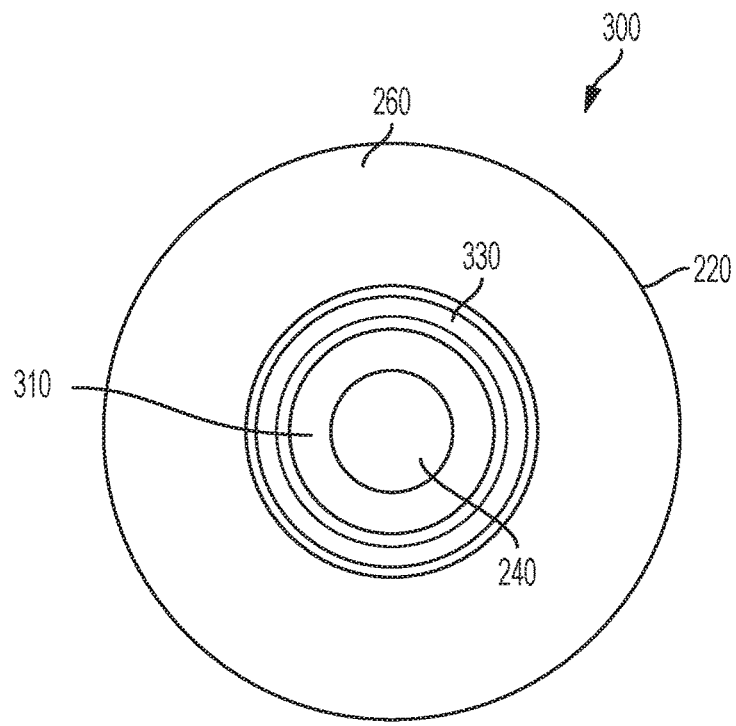
FIG. 3C is a bottom plan view of the flange of FIG. 3A.
Figure 3D:
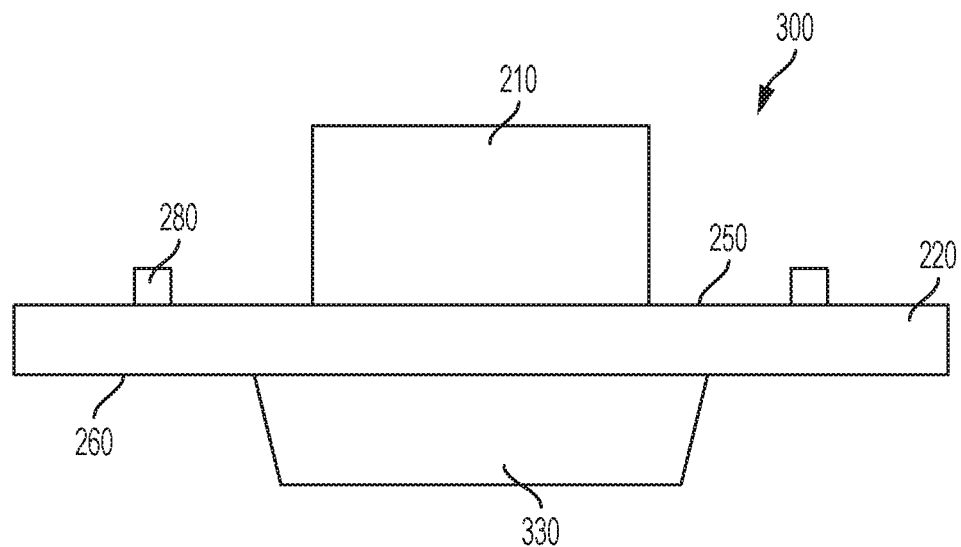
FIG. 3D is an elevation view of the flange of FIG. 3A.
Figure 3E:
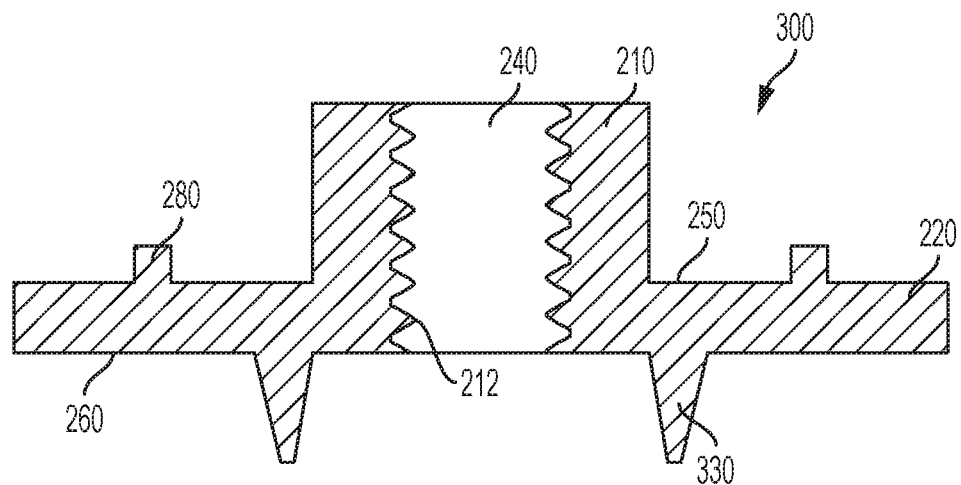
FIG. 3E is a sectional elevation view of the flange of FIG. 3A, taken at line 3E-3E of FIG. 3B.

Embodiments will now be described, by way of example only, with reference to the attached figures. With reference to FIG. 1, a simplified dock float member 100 used to support a dock, is provided. Dock float member 100 may have a generally rectangular prism shape, as shown, or it may have any other suitable shape. Dock float member 100 displaces water for providing buoyancy to the dock it is supporting. Dock float member 100 is typically installed below a generally rectangular frame (not shown) having a set of stringers and a plurality of cross members. A plurality of slats (not shown) are typically coupled across the top of the rectangular frame. Dock float member 100 has a hollow housing 110 defined by exterior wall 120. A recessed portion 130 may be formed on the exterior wall 120 of the dock float member 100. Recessed portion 130 may be formed on a top surface of the exterior wall 120. The recessed portion may be rectangular in shape or may have other suitable shape as seen, for example with reference to FIGS. 13-14. A hole 140 may be cut through on exterior wall 120. Hole 140 provides access to an interior of hollow housing 110. In one embodiment hole 140 is cut through in the recessed portion 130. In another embodiment hole 140 is cut through any portion of exterior wall 120. Hole 140 may circular, elliptical, or have any other suitable shape.

Turning now to FIGS. 2A-2E, which show a flange 200 used in conjunction with the dock float member 100, in accordance with an embodiment of the present disclosure. Flange 200 has a neck 210 and a planar member 220 outwardly extending from a base portion of neck 210. In one embodiment, neck 210 is cylindrical in shape, and planar member 220 is a disc. Neck 210 has an axial bore 240 having a cross section corresponding to hole 140. The cross-section of axial bore 240 may be equal to, slightly larger or slightly smaller than hole 140 such that, when aligned, axial bore 240 and hole 140 provide an access passage to the interior of hollow housing 110 as detailed below. The interior wall 212 which forms axial bore 240 may be threaded or ribbed making it suitable for receiving a corresponding threaded or ribbed shaft of a plug. In one embodiment, flange 200 is also provided with a guide ring 230 on the bottom side 260 of planar member 220. In the embodiment of FIGS. 2A-2E, the guide ring 230 has a rectangular cross section, and has an internal diameter larger than that of the axial bore 240. The purpose of guide ring 230 is to keep the flange in place during spin-welding, and to provide material which melts and serves as an adhesive between the flange and a surface. By having a larger diameter (and hence a larger cross-sectional area) than axial bore 240 of neck 210, the melted material from ring 230 does not block the access passage formed by axial bore 240 and hole 140 as it spreads on the top surface of recessed portion 130 of exterior wall 120 of dock float member 100 during spin-welding the flange 200 on recessed portion 130. A pair of protrusions 280 are provided on the top side 250 of planar member 220 of flange 200. Protrusions 280 are to facilitate handling the flange 200 by a spin-welding tool, for example.

In another embodiment shown in FIGS. 3A-3E, flange 300 has a neck 310 which is slightly longer than neck 210 of the flange of FIGS. 3A-3E, and is provided with a guide ring 330 having a tapered edge and a trapezoidal cross-section. The tapered edge of guide ring 330 advantageously leads to less spreading of melted material (see 290 in FIG. 7) from flange 300 which may partially block the access passage formed by axial bore 240 and hole 140.

Figure 4:
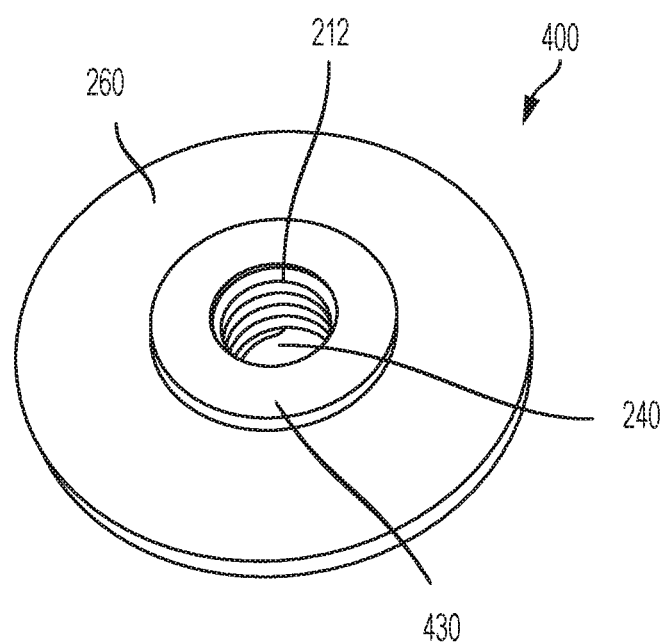
FIG. 4 is a bottom perspective view of a flange, in accordance with yet another embodiment of the present disclosure.

In yet another embodiment, flange 400, shown in FIG. 4, is provided. Flange 400 has a similar structure to flanges 200 and 300, but differs in that it has a guide ring 430 which has an internal diameter coinciding with the axial bore 240, and a wider external diameter than guides 230 and 330. Accordingly guide 430 has a larger surface area which comes into contact with the top surface of recessed portion 130 of exterior wall 120 of dock float member 100 during spin-welding. Guide 430 also has a shorter height so the material which melts and provides adhesion is not excessive so as to block the access passage formed by hole 140 and axial bore 240.

Figure 5:
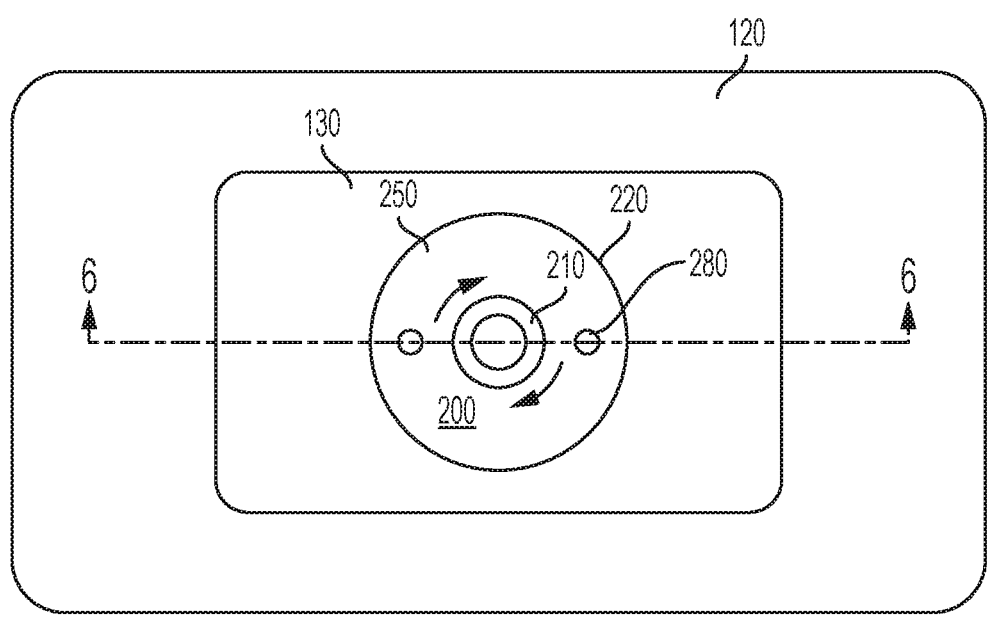
FIG. 5 is a top plan view showing the step of spin-welding a flange to the float member.
Figure 6:
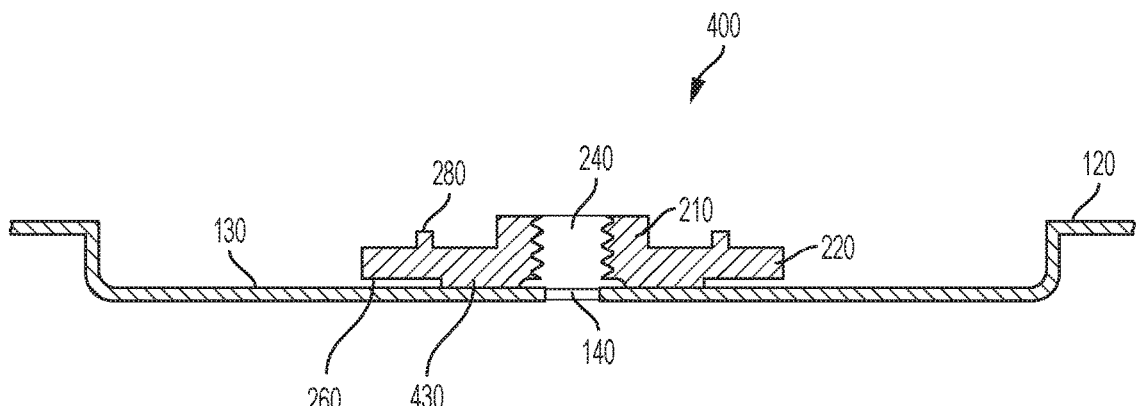
FIG. 6 is a partial sectional elevation view showing the flange being spin-welded to the float member, taken at line 6-6 of FIG. 6.
Figure 7:
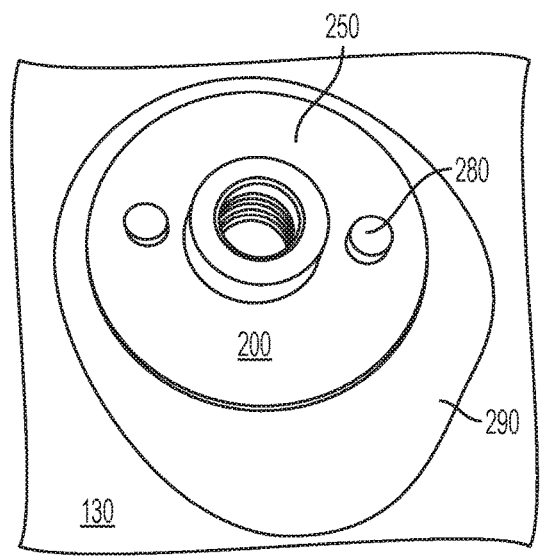
FIG. 7 is a partial perspective view showing the flange after being spin-welded to the float member.

Flange 200, 300, or 400 may be attached to dock float member 100 by suitable means. For example, flange 200, 300, or 400 may be attached to dock float member 100 using fasteners or adhesive materials. In a preferred embodiment, shown with reference to FIGS. 5 and 6, spin-welding is used. Flange 200, 300, or 400 is brought into contact with exterior wall 120 of hollow housing 110, preferably in recessed portion 130. Flange 200, 300, or 400 is positioned on top of recessed portion 130, such that the axial bore 240 of neck 210, or 310 is aligned with hole 140. Guide ring 230, 330, or 430 is brought into contact with the top surface of recessed portion 130. A spin-welding tool grabs the flange 200, 300, or 400 by protrusions 280. The flange 200, 300, or 400 is then spun at a high speed for a brief period of time such that friction is produced between guide ring 230, 330, or 430 and the top surface of recessed portion 130. With reference to FIG. 6, the produced friction generates heat causing guide ring 430 to melt, and form a sealing bond between bottom side 260 of planar member 220 and the top surface of recessed portion 130 of exterior wall 120. As shown in FIG. 6 the sealing bond may be confined to the region around hole 140. In another embodiment, flange 200, 300, or 400 is spun until a bottom portion of the bottom side 260 of planar member 220 melts. In that case the sealing bond may cover the entire region between bottom side 260 and the surface of recessed portion 130. In some embodiments, the sealing bond 290 may extend outwardly beyond the edges of planar member 220, as seen in FIG. 7. As flange 200, 300, or 400 becomes tightly connected to float member 100 around hole 140, the neck's axial bore 240 and hole 140 provide an access passage to the hollow interior of housing 110 of float member 100. The interior of dock float member 100 can then be filled with a light material such as polystyrene through that access passage.

Figure 8A:
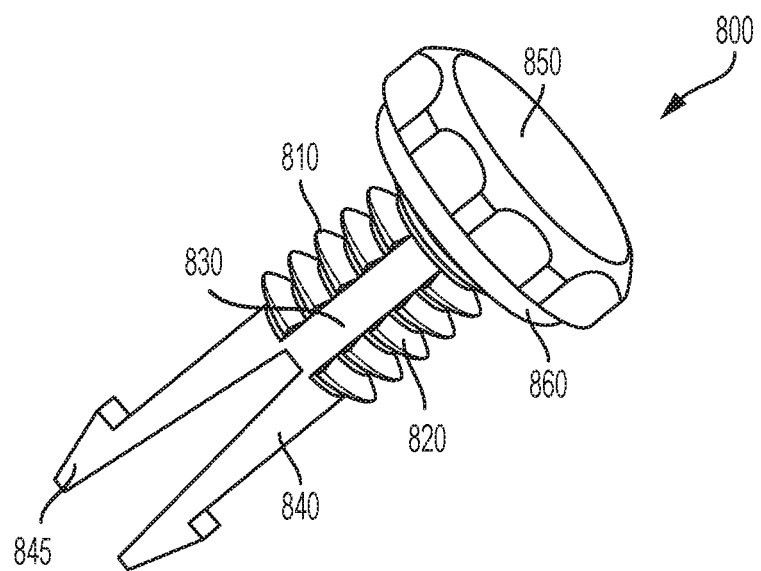
FIG. 8A is a side perspective view of a plug, in accordance with an embodiment of the present disclosure.
Figure 8B:
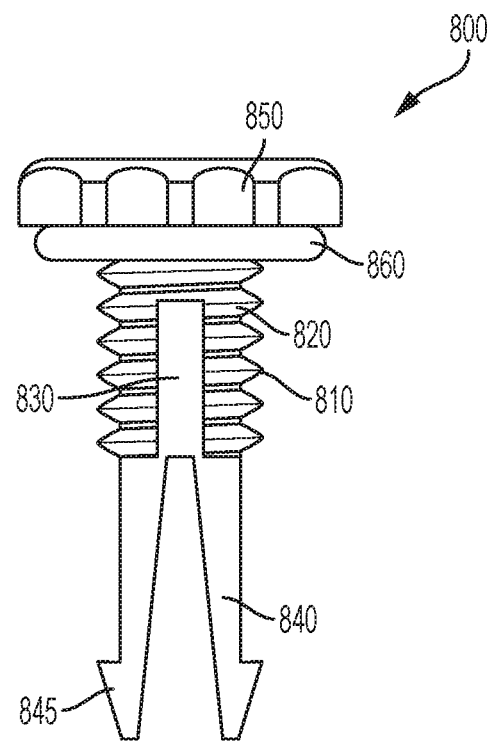
FIG. 8B is a side view of the plug of FIG. 8A.
Figure 9:
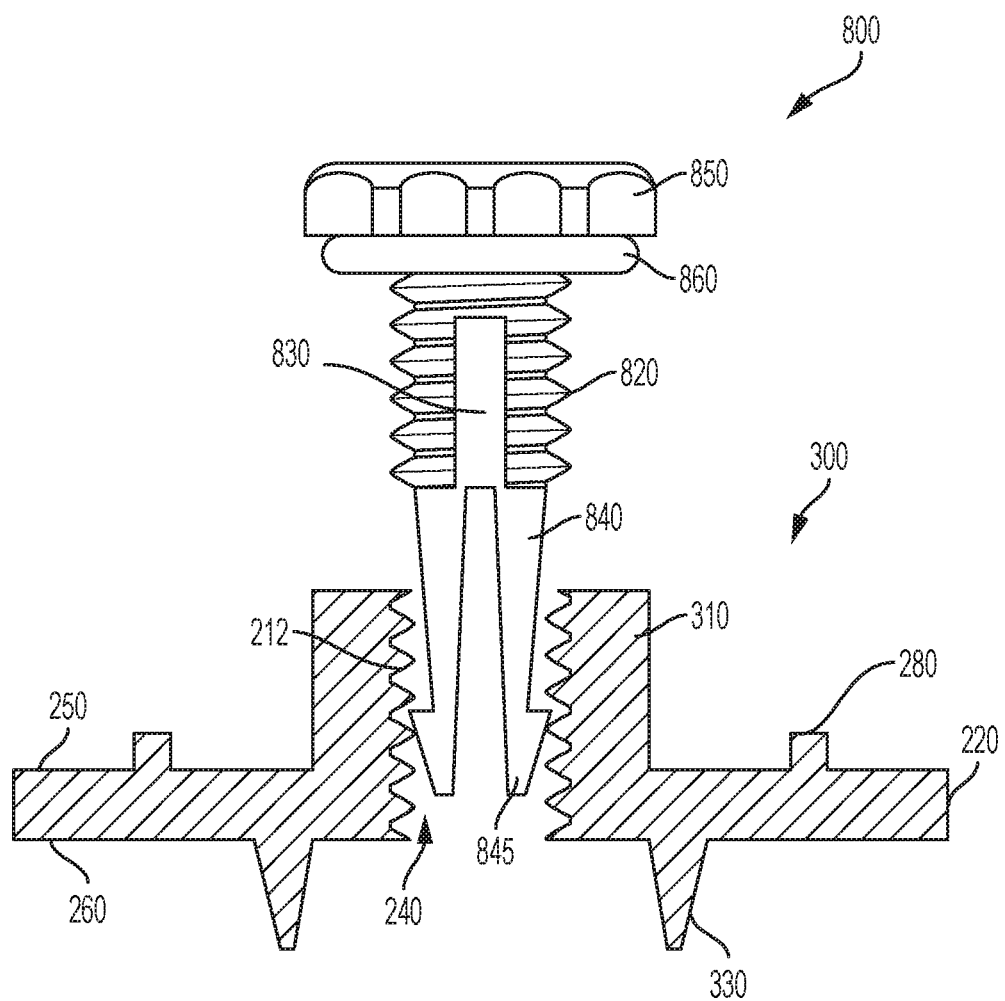
FIG. 9 is a partial side sectional view of the plug of FIGS. 8A-8B as it is being inserted inside the neck of the flange of FIGS. 3A-3E.
Figure 10:
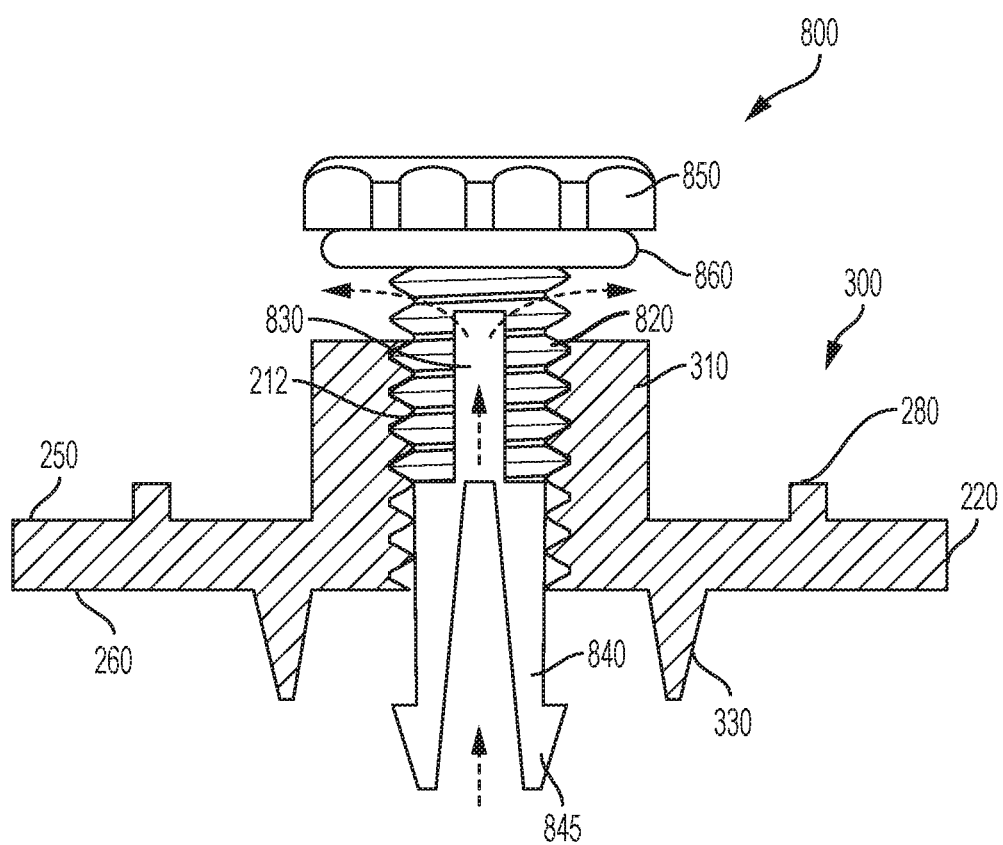
FIG. 10 is a partial side sectional view of the plug of FIGS. 8A-8B after it has been inserted inside the neck of the flange of FIGS. 3A-3E, in a closed but non-sealing position.

Turning now to FIGS. 8A-8B which show a plug 800 that may be used in conjunction with flange 200, 300, or 400. Plug 800 features a shaft 810 sized for fitting in the axial bore 240 of neck 210, or 310. Plug 800 has a handle 850 connected to the top end portion of shaft 810 to facilitate inserting, loosening, or tightening shaft 810 inside axial bore 240 of neck 210. A venting passage is formed along shaft 810. In one embodiment, the venting passage is in the form of a longitudinal groove 830 formed on at least a portion of shaft 810, proximal to handle 850 but spaced therefrom for allowing ventilation of the interior of the housing 110 therethrough when the plug is in a partially-tightened venting position. In one embodiment the neck axial bore 240 is threaded, and shaft 810 has a thread 820 corresponding to the threading of axial bore 240. In another embodiment both axial bore 240 and shaft 810 are ribbed to engage one another in a tight fit. In other embodiments (not shown) plug 800 may frictionally fit within the axial bore 240. A sealing member is positioned around and near the top end portion of shaft 810 beneath handle 850. The sealing member may be in the form of an o-ring, a gasket or any other sealing alternative apparent to persons skilled in the art. In one embodiment the sealing member is a gasket 860 which forms a seal between head 850 and the top surface of recessed portion 130 or exterior wall 120. The formed seal serves to maintain a tight seal of the interior of hollow housing 110 of dock float member 100, when plug 800 is in a fully tightened sealing position. Gasket 860 is positioned around the shaft proximal to the handle 850 and dimensioned to permit ventilation through the venting passage 830 when plug 800 is in a partially tightened venting position, as shown in FIG. 10. In some embodiments (not shown), the shaft 810 is cylindrical throughout and the plug 800 may be removed from the axial bore 240 at any time. In another preferred embodiment, a retaining member is formed on or attached to a bottom end portion of shaft 810 for keeping the shaft 810 inside axial bore 240 once inserted therein. Advantageously, this ensures that the plug 800 is not accidentally removed from the float member 100 potentially exposing the interior of housing 110 to being filled by water or dirt. In one embodiment, the retaining member is comprised of two fingers 840 flexibly biased in a bifurcated retaining position. The two fingers 840 maybe be pushed inwardly towards one another, to a non-retaining position by using a tool (not shown) such as needle-nose pliers. This permits shaft 810 to be inserted into axial bore 240 as depicted in FIG. 9. The two fingers 840 may terminate in hook-shaped ends 845 at lower ends thereof. The hook-shaped ends 845 may have outwardly facing sloping surfaces shaped to glide along the threaded or ribbed portion 212 of axial bore 240 as the plug 800 is inserted into flange 200, 300 or 400. Once the lower ends of the two fingers 840 clear the axial bore 240, they flex outwardly to their retaining position thus preventing the plug 800 from being removed from the flange.

Figure 11:
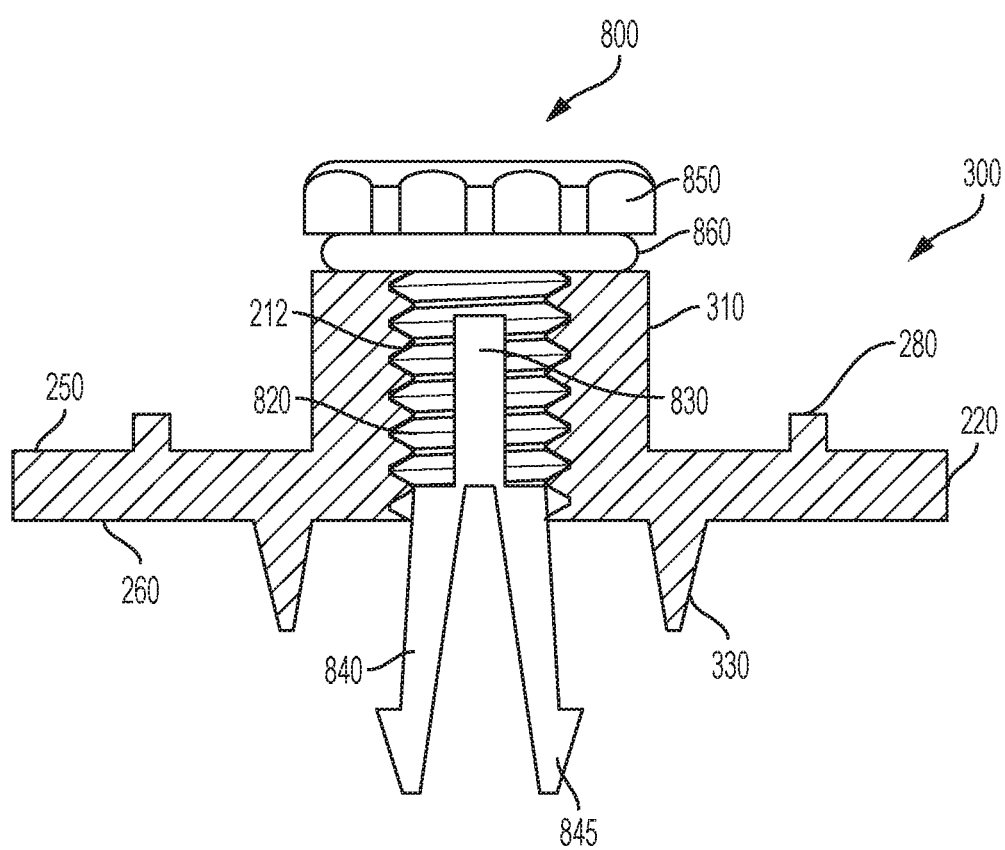
FIG. 11 shows a partial side sectional view of the plug of FIGS. 8A-8B, after it has been tightened to a closed and sealing position inside the neck of the flange of FIGS. 3A-3E.
Figure 12:
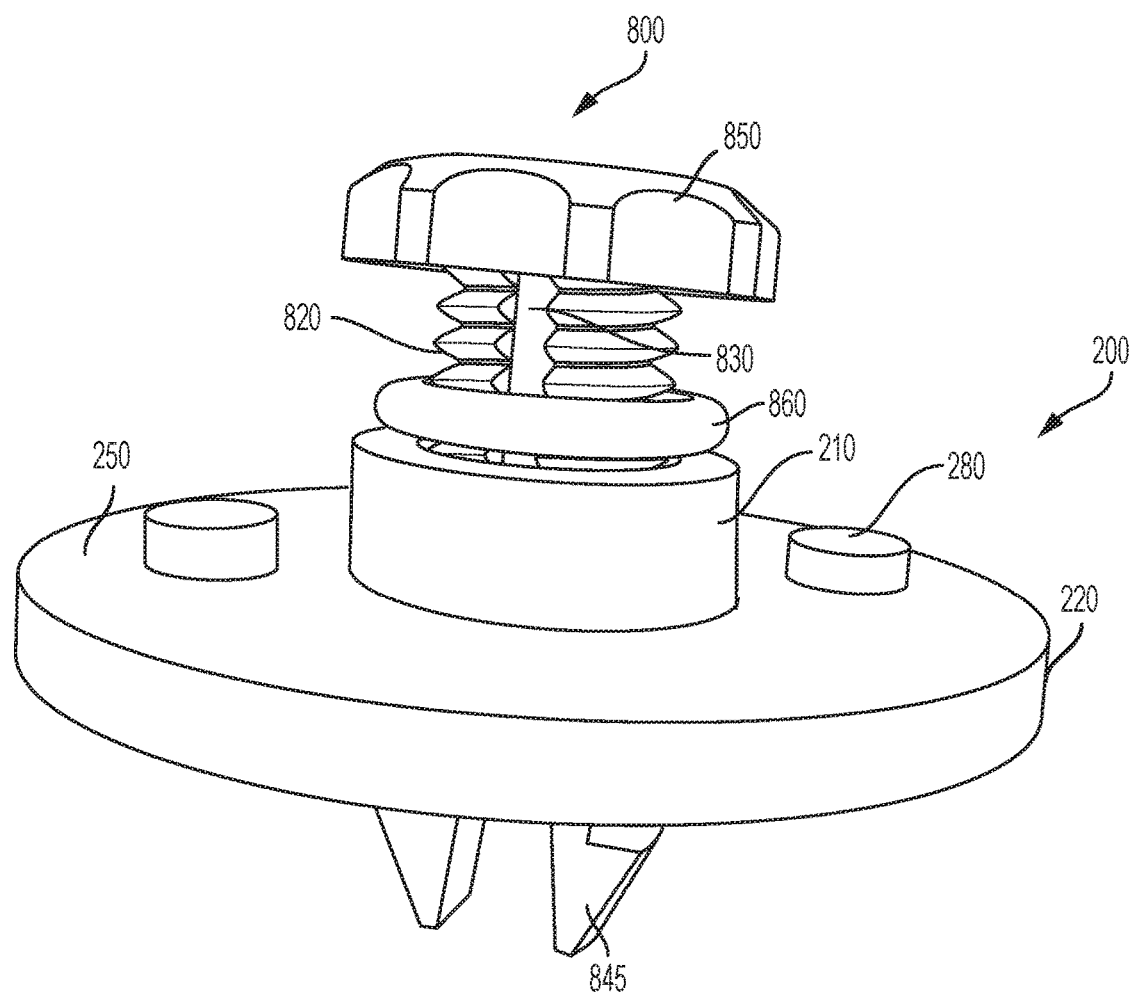
FIG. 12 is a perspective view showing the plug of FIGS. 3A-3B partially inserted into a flange.

The interior of float member 100 can be filled with a light material to prevent deformation of the floating member while maintaining buoyancy. An example of such material is polystyrene foam. In one embodiment the interior is filled with polystyrene through the access passage provided by the axial bore 240 of flange neck 210, or 310 and hole 140. The step of filling the interior with polystyrene produces Pentane gas in the interior. The presence of Pentane inside the interior is problematic as it keeps the polystyrene in active state, thus causing it to expand further which may cause the deformation of dock float member 100. At the same time, no other materials or liquids should enter the interior of dock float member 100, where they may cause damage to the polystyrene. To accomplish both goals, once the interior is filled, plug 800 is used to close neck axial bore 240, however, plug 800 is not fully tightened, and is in a partially tightened venting position shown in FIG. 10 and FIG. 12. Advantageously, gas, such as Pentane, trapped inside the interior of float member 100, is allowed to be vented out through venting passage 830 of plug 800, as shown in FIG. 10. After an appropriate amount of time after which the majority of the gas is expected to have been vented out, plug 800 is tightened to a fully tightened sealing position. Tightly sealing the interior of dock float member 100 prevents other materials and liquids from entering the interior of dock float member 100, as shown in FIG. 11.

Figure 13:
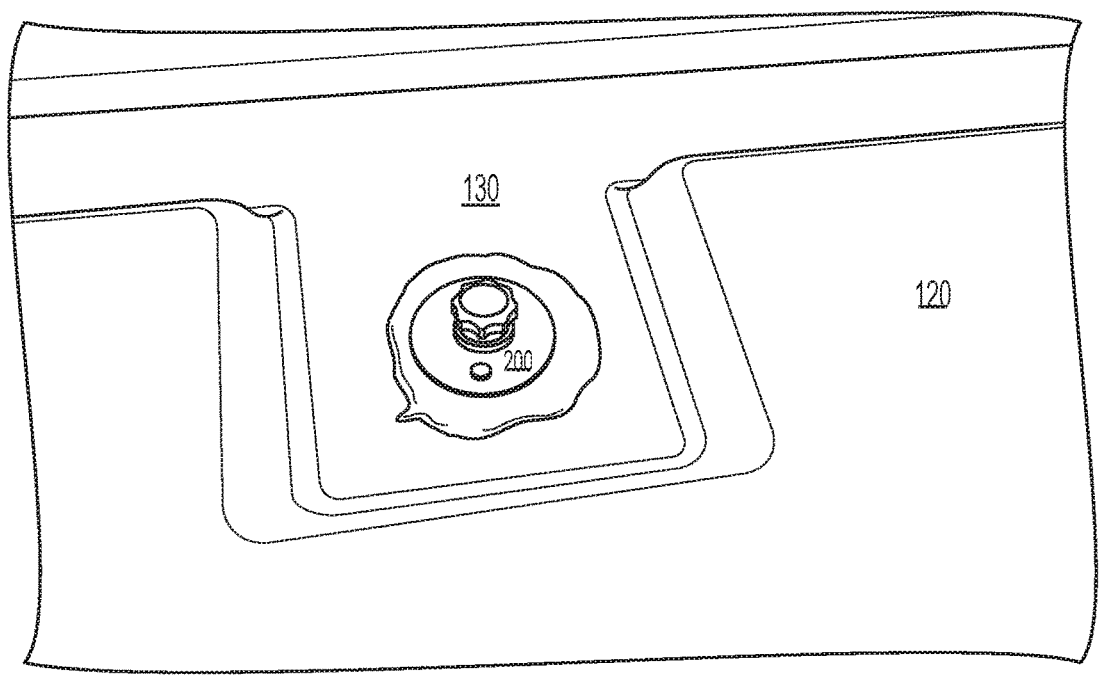
FIG. 13 is a top partial perspective view of a dock float having a flanged spin-welded thereon, and a plug inserted in the flange.

FIG. 13 is a close-up partial perspective view of a dock float which depicts a portion of a dock float member 100 showing recessed portion 130 and exterior wall 120. FIG. 14 is a zoomed-out view similar to FIG. 13. In both FIGS. 13 and 14, a flange has been spin-welded to the dock float member in recessed portion 130, and in alignment with a hole (not visible) such that the hole and the flange's axial bore provides an access passage to the interior of the dock float member housing. The interior of the float member has been filled with a light material such as polystyrene, a plug has been inserted but left in a partially tightened venting position to vent the Pentane gas out, and the plug is shown having been subsequently fully tightened to seal the interior of the hollow housing.

While the invention has been described with specificity to wooden docks, other types of docks will occur to those of skill in the art.

The above-described embodiments are intended to be examples of the present invention and alterations and modifications may be effected thereto, by those of skill in the art, without departing from the scope of the invention that is defined solely by the claims appended hereto.

What is claimed is:
1. A vented dock float, comprising:
   a float member for displacing a liquid to produce buoyancy, the float member having a hollow housing defined by an exterior wall including a hole in a portion thereof;
   a flange comprising a neck having an axial bore formed by interior walls, and a planar member outwardly extending from a base portion of the neck, the flange being sealedly attached to the housing such that the neck bore is in alignment with the hole in the exterior wall to form an access passage to the interior of the housing; and a plug comprising a shaft sized for insertion in the bore for blocking the access passage when the plug is in a sealing position, and a handle connected to a top end of the shaft for facilitating gripping the plug;

wherein the interior is filled with a material having a density less than the density of the liquid; and wherein the shaft has a venting passage formed along at least a portion thereof for permitting ventilation of the interior of the hollow housing when the plug is in a venting position.

2. The vented dock float of claim 1, wherein: both the interior walls of the bore and the shaft are threaded and threadably engaged, the plug is partially tightened in the venting position, and the plug is fully tightened in the sealing position.

3. The vented dock float of claim 1, wherein: both the interior walls of the axial bore and the shaft are ribbed and tightly fit to one another, the plug is partially inserted in the bore in the venting position, and the plug is fully inserted in the bore in the sealing position.

4. The vented dock float of claim 1, further comprising a sealing member operably positioned around the shaft beneath the handle for sealing the access passage when the plug is in the sealing position.

5. The vented dock float of claim 1, further comprising at least one protrusion on a top side of the planar member to facilitate handling of the flange by a spin-welding tool.

6. The vented dock float of claim 1, wherein both the shaft and the neck are cylindrical, and wherein the planar member is a disk.

7. The vented dock float of claim 1, wherein the venting passage comprises a longitudinal groove.

8. The vented dock float of claim 1, wherein the venting passage is proximal to the handle but spaced therefrom for allowing ventilation of the interior of the housing therethrough when the plug is in the venting position.

9. The vented dock float of claim 1, wherein the plug further comprises a retaining member for retaining the plug within the axial bore of the flange's neck once inserted therein.

10. The vented dock float of claim 9, wherein the retaining member comprises two fingers flexibly biased in a bifurcated retaining position.

11. The vented dock float of claim 10, wherein the two fingers each terminates in hook-shaped ends.

12. The vented dock float of claim 1, wherein the planar member is sealedly attached to the exterior wall of the housing by spin-welding.

13. The vented dock float of claim 1, wherein the flange is circular and the planar member is a disk, and wherein the flange further comprises a guide ring formed along a bottom surface of the disk and concentric with the neck.

14. A method for providing a vented dock float with a venting mechanism, comprising:

drilling a hole through a wall of a housing of the dock float to access an interior of the housing; and welding a flange comprising a neck having an axial bore formed by interior walls, a planar member outwardly extending from a base of the neck, and a guide ring on a bottom side of the planar member to the exterior wall of the housing such that the axial bore is aligned and coaxial with the hole for providing an access passage to the interior of the housing.

15. The method of claim 14, further comprising filling, through the axial bore, the interior of the housing with a material having a density less than a density of a liquid.

16. The method of claim 14, wherein the welding comprises spin-welding the circular flange in frictional engagement with the exterior wall around the hole such that heat is produced by friction causing melting of at least one of: a portion of the guide ring and a portion of the disk to form a sealed connection with the wall.

17. The method of claim 15, wherein the material is polystyrene, and wherein the step of filling the interior with polystyrene produces pentane gas as a by-product.

18. The method of claim 14, further comprising inserting a plug into the axial bore of the neck in a venting non-sealing position for allowing ventilation of the interior.

19. The method of claim 18, further comprising moving the plug into a sealing position for sealing the interior.

* * * * *